No. 812,408. PATENTED FEB. 13, 1906.
R. E. DICKERSON.
EDUCATIONAL DEVICE FOR TEACHING SPHERICS.
APPLICATION FILED AUG. 19, 1905.
2 SHEETS—SHEET 2.
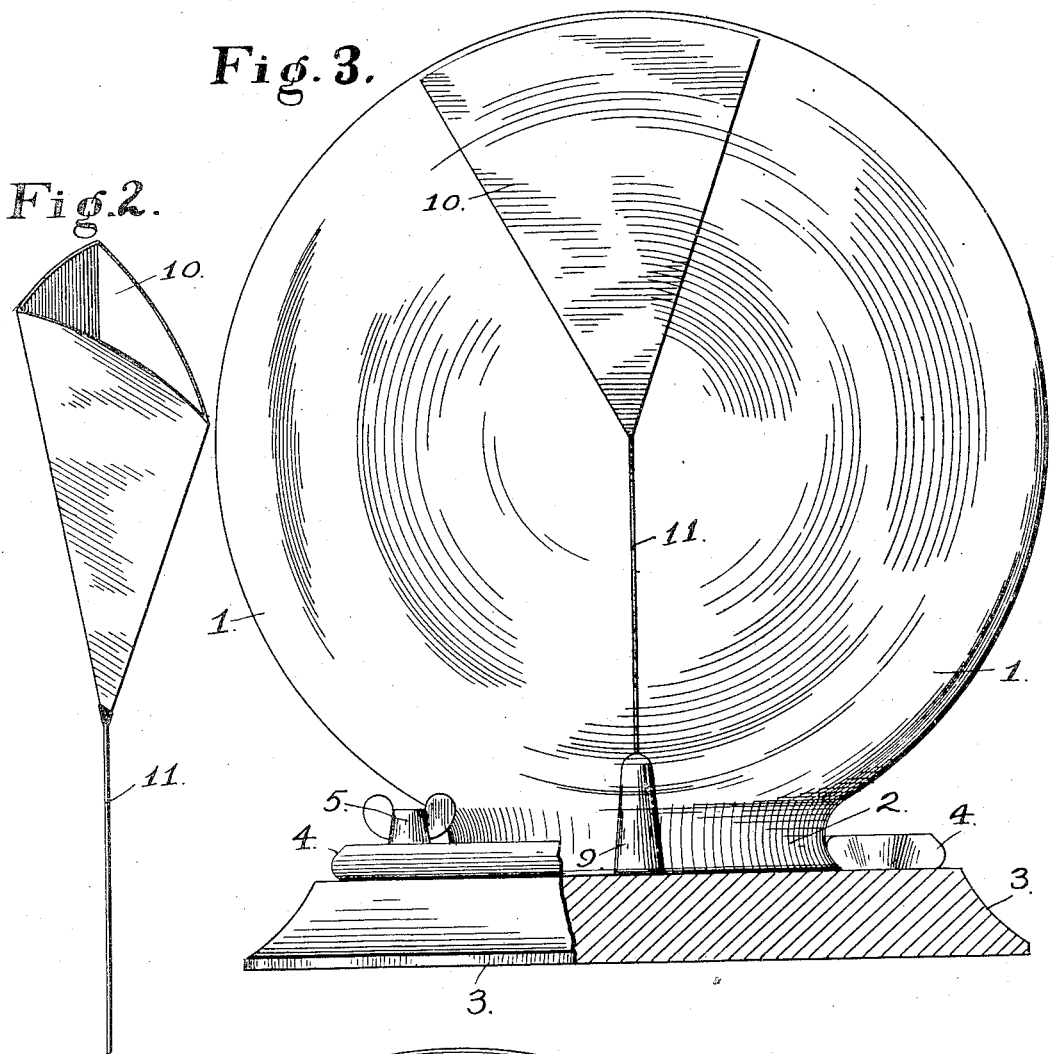
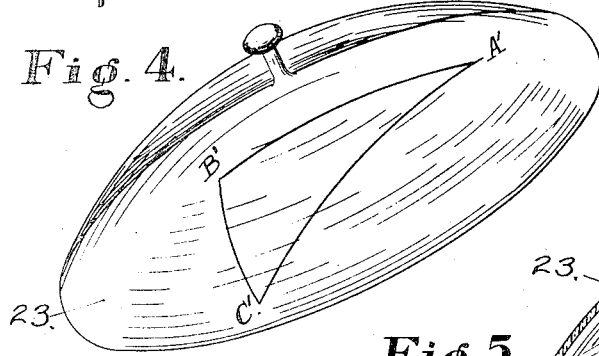
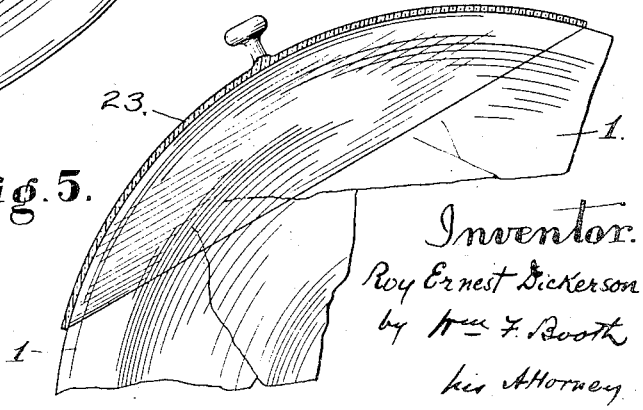
Witnesses:
Arthur L. Slee
J. Crokton
Inventor.
Roy Ernest Dickerson
by Wm. F. Booth
his Attorney

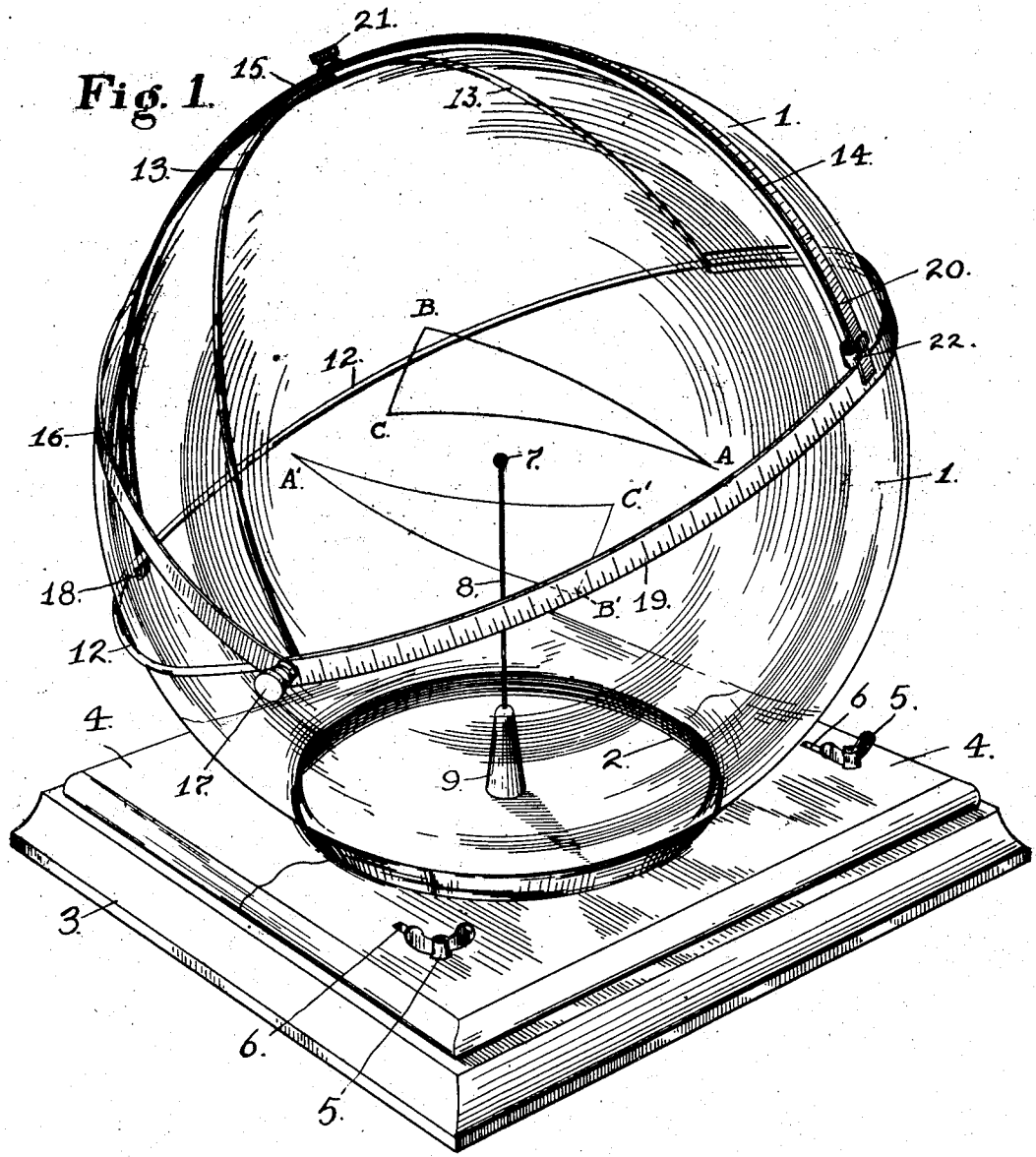

UNITED STATES PATENT OFFICE.

ROY ERNEST DICKERSON, OF BOULDER CREEK, CALIFORNIA.

EDUCATIONAL DEVICE FOR TEACHING SPHERICS.

No. 812,408.

Specification of Letters Patent.

Patented Feb. 13, 1906.

Application filed August 19, 1905. Serial No. 274,818.

*To all whom it may concern:*

Be it known that I, ROY ERNEST DICKERSON, a citizen of the United States, residing at Boulder Creek, Santa Cruz county, State of California, have invented certain new and useful Improvements in Educational Devices for Teaching Spherics; and I do hereby declare the following to be a full, clear, and exact description of the same.

My invention relates to the general class of educational appliances, and particularly to devices for illustrating and teaching mathematical relations, especially those which pertain to the sphere.

For illustrating the propositions of spherics, whether those of geometry or trigonometry, it is common to use an opaque sphere with a blackboard-surface. Two disadvantages of this device are quite pronounced, both growing out of the opacity of the spherical blackboard. The first is the difficulty of delineating with sufficient accuracy antipodal figures, and the second is the difficulty of visualizing successively-seen figures on opposite sides of the board long enough to permit a proper comparison. These and other disadvantages of the appliance now in use my invention overcomes, and at the same time it secures advantages peculiar to itself, all of which will be hereinafter fully explained.

The nature of my said invention will be seen from the following description, taken in connection with the accompanying drawings, to which reference is hereby made.

In the drawings, Figure 1 is a perspective view of the device, showing the spherical protractor fitted to it. Fig. 2 is a perspective view of one of the figure forms which may be used in connection with the device. Fig. 3 is a detail view showing such use. Fig. 4 is a perspective view of the transferrer. Fig. 5 is a detail view showing the transferrer fitted to the sphere.

The sphere, or, as it may be termed, the "spherical board," 1 is essentially transparent. It may be made of any suitable material which will permit vision through it, so that marks anywhere upon its surface may be seen without change of position either of the observer or of the board. In practice a glass globe will be found well adapted for the purpose, both because such globes are already on the market for various purposes and because a pencil or crayon adapted to mark on glass is now well known. The globe, though it may be a perfect sphere, is for all practical considerations one which has a truncated flanged foot 2, which enables it to be satisfactorily mounted. The mounting here shown comprises a base 3, having on its top a sectional clamp 4, engaging the flanged foot 2 of the transparent spherical board 1. This clamp 4 consists of a plate divided into two sections, as indicated in Fig. 1, the adjacent edges of the two sections being provided with a semicircular socket adapted to embrace the foot of the board 1. One of the sections of the clamp 4 is a removable and adjustable one, as indicated by the thumb-screws 5, fitted in slots 6, thus adapting the clamp to be opened for the insertion and removal of the sphere and closed to retain and hold it firmly. These operations are effected by loosening the thumb-screws 5, which pass through the slots 6 into the base 3, and slipping the movable section backward away from the other section until it frees the foot of the board 1, and by pushing said section up again to its place to engage the foot of said board, and then tightening the thumb-screws. A further essential for the fullest adaptation of the device for the uses intended is that the transparent spherical board 1 be hollow, as here shown, access to its cavity being had through its open foot 2. This feature permits the most convenient use of several interior accessories, the principal one of which is the center sight 7. This sight may be of any suitable character. It is here shown as a small ball mounted on the top of a stem 8, which is fitted removably in a socketed post 9, rising from the base 3. The sight 7 lies in the center of the sphere and enables the vision to be accurately directed diametrically to determine antipodal localities in the drawing of corresponding or related figures. The hollowness of the sphere and the construction of the base as thus described are of further utility in connection with any suitable figure forms. One such form is shown in Fig. 2. This form 10 is made of any suitable material and is mounted upon a stem 11, which when the center sight 7, with its stem 8, is removed from the post 9 replaces said sight by fitting its own stem in the post, as is seen in Fig. 3. The figure form 10 is thus mounted within the hollow sphere, and its upper edge is raised up sufficiently close to the inner wall of the sphere to enable the instructor to easily and accurately trace its outline in pencil upon the outer surface of the board. This figure form 10 represents any of a series of forms which may be thus used for the purpose of accurate delineation on the board.

In connection with the spherical board it is often advantageous to use a spherical protractor, such as is here shown. It is composed of a great-circle band 12 and two half-great-circle bands 13 and 14, secured together, the latter in planes at right angles to each other and both at right angles to the great-circle band 12. A kind of basket is thus formed which readily fits upon and is movable over the sphere 1 to any position desired, as is seen in Fig. 1. These bands indicate the great circles and may be used as rules or guides in marking said circles upon the board. One of the half-circle bands throughout one-half its length is provided with a scale 15, over which the extremity of a swinging arm 16 is adapted to play. This arm 16 is pivotally connected at its other end to the great-circle band 12 and is set by a thumb-screw 17. A small clamp 18, which is secured to the band 12 and is similar to the clamp 22, hereinafter described, is adapted to engage the free end of the arm to hold it when not in use. By means of this arm angles may be measured. One-half of the great-circle band 12 is provided with a scale 19, over which the extremity of an arm 20 is adapted to play. The other end of this arm is pivotally connected to the half-circle bands at their intersection and is set by a screw 21. A small clamp 22, which is secured to the half-circle band 14, and consists of a small piece of spring metal, is adapted to engage the free end of the arm to hold it when not in use. By means of this arm arcs on the great circle may be measured. The protractor is adapted to be readily fitted to and removed from the board as needed.

In Fig. 4 is shown what may be termed a "transferrer." It consists of a saucer-like plate 23, having a concavity substantially corresponding to the convexity of the board 1, so that it may be fitted to and readily slipped over the exterior of the board from place to place, as seen in Fig. 5. In its most useful form the transferrer is best made transparent, so that figures may be readily traced thereon from the board 1.

In the use of this educational device the advantages of the transparent spherical board in enabling accurate antipodal drawing and simultaneous visualization of opposite figures are obvious. Some of its further advantages and uses may be described as follows: The center sight 7 is a guide to the eye and enables one to draw free-hand figures rapidly and accurately. It checks up the accuracy and brings out the relations of opposite symmetrical triangles and polygons. It aids the eye in locating diametrically opposite points. Such propositions as "Two vertical spherical polygons are symmetrical," "Two vertical symmetrical isosceles spherical triangles are equal," "If two angles of a spherical triangle are equal, the opposite sides are equal," "Three planes passed through the center of a sphere, each perpendicular to the other two, divide the surface of the sphere into eight trirectangular triangles," "The shortest line that can be drawn on the surface of a sphere between two points is the arc of a great circle not greater than a semicircumference joining these points," "Two symmetrical spherical triangles are equivalent," and many others are clearly seen when a central reference-point is given.

The device is not confined to spherical geometry and trigonometry. It may be used in connection with astronomy and physical geography. Thus the center sight may be considered the earth and the hollow sphere a celestial globe of infinite radius. Then the positions of the heavenly bodies can be readily located. Again, the center sight would bring out antipodal relations if a map of the world were drawn upon the sphere. The meridians and parallels could be shown completely, and corresponding points one hundred and eighty degrees apart could be readily located by sighting on the center.

The transferrer 23 enables one to transfer figures about the surface of the sphere at will. In order to bring out more clearly the use of the transferrer, I have shown on the spherical board 1 two small triangles A B C and A' B' C', which are opposite symmetrical triangles. Make a trace of A' B' C' upon the transferrer 23 and slide it over the sphere to the triangle A B C. An attempted superposition brings out the fact that although the triangles have equal parts these parts are oppositely arranged—i. e., they are symmetrical. This transferrer becomes especially handy in the study of the proposition "If two spherical triangles have two sides and included angle of one respectively equal to two sides and included angle of the other, the triangles are congruent or symmetrical." When the transferrer is made of transparent material, it is especially useful in geography to transfer figures by tracing from an ordinary globe to the transparent sphere.

The spherical protractor has the same general uses as an ordinary one has—i. e., the construction, bisection, and comparison of angles, and in addition the measurement of arcs and construction of great circles. It is also useful in drawing and showing polar relationships. It can be used in geography for the quick drawing of figures.

The construction of the base 3 with its clamp 4 by permitting the hollow sphere to be readily taken off enables one to place inside various figure forms, such as the form 10 of Fig. 2. The base also gives great stability to the apparatus.

Having thus described my invention, what

I claim as new, and desire to secure by Letters Patent, is—

1. In an educational device for teaching spherics, a transparent, spherical board, having a center sight.

2. In an educational device for teaching spherics, a transparent, hollow, spherical board, having a center sight.

3. An educational device for teaching spherics, comprising a transparent, hollow, spherical board, having an open foot; a base on which the board is supported by its foot, and a clamping device engaging the foot for removably connecting the board with the base.

4. An educational device for teaching spherics, comprising a transparent, hollow, spherical board, having an open foot by which it is supported; a base with means for detachably connecting the board thereto, and means on the base for supporting accessory devices within the transparent, hollow board.

5. An educational device for teaching spherics, comprising a transparent, hollow, spherical board, having an open foot by which it is supported; a base with means for detachably connecting the board thereto, and a post rising from the base through the open foot of the board, adapted to support accessory devices within said transparent hollow board.

6. An educational device for teaching spherics, comprising a transparent, hollow, spherical board, having an open foot by which it is supported; a base with means for detachably connecting the board thereto; a post rising from the base through the open foot of the board, and a center sight having a stem removably fitted to said post.

7. An educational device for teaching spherics, comprising a transparent, hollow spherical board, having an open foot by which it is supported; a base with means for detachably connecting the board thereto; a post rising from the base through the open foot of the board, and a figure form having a stem removably fitted to the post whereby said form is supported within said transparent hollow board.

8. In an educational device for teaching spherics, the combination of a transparent, hollow, spherical board, with a figure form removably fitted in its cavity in such relation to its wall as to be capable of being traced upon the surface of the board.

9. In an educational device for teaching spherics, and in combination with a spherical board, a spherical protractor adjustably fitted thereto and comprising a great-circle band, and suitable half-circle bands secured thereto.

10. In an educational device for teaching spherics, and in combination with a spherical board, a spherical protractor adjustably fitted thereto and comprising a great-circle band, and suitable half-circle bands secured thereto, said bands having scales and reading-arms for measuring angles and arcs.

11. In an educational device for teaching spherics, the combination of a transparent spherical board with a spherical protractor adjustably fitted to its surface and comprising a great-circle band and suitable half-circle bands secured thereto, said bands having scales and reading-arms for measuring angles and arcs.

12. In an educational device for teaching spherics, the combination of a transparent spherical board having a center sight, and a spherical protractor adjustably fitted to the surface of said board and comprising a great-circle band and suitable half-circle bands secured thereto, said bands having scales and reading-arms for measuring angles and arcs.

13. In an educational device for teaching spherics, the combination of a transparent spherical board, and a concave transfer-plate adapted to be fitted to and to slide over the surface of said board.

14. In an educational device for teaching spherics, the combination of a transparent spherical board, and a concave transfer-plate adapted to be fitted to and to slide over the surface of said board, said transfer-plate being made of transparent material.

In witness whereof I have hereunto set my hand.

ROY ERNEST DICKERSON.

Witnesses:
C. M. COOLEY,
M. A. BEARDSLEY.